Sept. 19, 1939.    J. H. DE BOER ET AL    2,173,249
ASYMMETRIC ELECTRODE SYSTEM
Filed Oct. 21, 1936
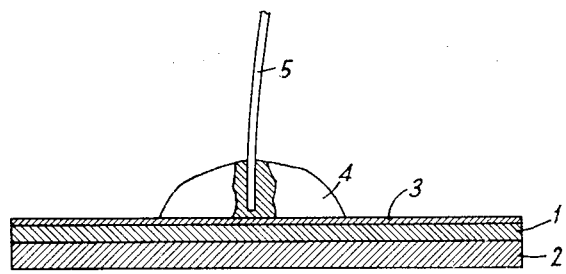
INVENTORS
JAN HENDRIK DE BOER AND
WILLEM CHRISTIAAN VAN GEEL
BY
Charles McClair
ATTORNEY Patented Sept. 19, 1939

2,173,249

UNITED STATES PATENT OFFICE 2,173,249

ASYMMETRIC ELECTRODE SYSTEM

Jan Hendrik de Boer and Willem Christiaan van Geel, Eindhoven, Netherlands, assignors to N. V. Philips' Gloeilampenfabrieken Application October 21, 1936, Serial No. 106,772
In Germany October 30, 1935

10 Claims. (Cl. 175—366)

This invention relates to an electrode system with asymmetrical conductivity wherein selenium is used for one of the electrodes.

As is well known selenium is a semi-conductor, so that an electrode consisting of selenium has a high resistance.

The principal object of the invention is to provide an electrode system of the type described, in which the selenium has a conductivity which is many times, for example from one hundred to a thousand times, higher than that of commonly marketed selenium, which depends principally on the selenium started with.

The novel features which we believe to be characteristic of our invention are set forth with particularity in the appended claims, but the invention itself will best be understood by reference to the following description taken in connection with the accompanying drawing in which the single figure in the drawing is a vertical section of an electrode system made in accordance with our invention.

It is known in photoelectric cells having an insulating coating to add to the selenium metals or compounds by which the conductivity is increased. However, this increased conductivity is appreciably lower than that obtained by the present invention.

According to the invention this high conductivity results from the fact that the selenium contains one or more iodides. Preferably the percentage of this addition amounts to at least 0.05%. Generally quantities exceeding 1% do not appreciably affect the conductivity.

Although the particular influence of iodides cannot be fully accounted for in this respect, probably the fact that iodides have the property of dividing themselves very finely in the selenium plays a part in rendering the selenium sensitive.

Additions of compounds of iodine with at least one element of the analytic hydrogen sulphide group (mercury in mercuric form, bismuth, copper, cadmium, arsenic, antimony, tin), preferably in a quantity of 1% are very suitable.

By using bismuth iodide, for instance in a quantity of 1% the specific resistance of the selenium is reduced down to 600 ohms per cm³. When using cuprous iodide (CuI) the specific resistance of the selenium amounts to about 1500 ohms per cm³. By using antimony iodide ($SbI_3$) we have succeeded in reducing the specific resistance of selenium down to 1000 ohms per cm³. The use of the complex compound potassium mercury iodide ($K_2HgI_4$) also permits the specific resistance of selenium to be reduced down to 1000 ohms per cm³. When using stannous- and also stannic-iodide ($SnI_2$ and $SnI_4$ respectively) the specific resistance of selenium can be reduced down to 1100 ohms per cm³.

It has been found that a further improvement can be secured by adding the iodides with the aid of a particular method. According to this method at least two constituents are added separately which form a compound with each other only after the mixing operation in the selenium. Preferably, the constituents to be added should be soluble in selenium and, after having been dissolved, separately form together an insoluble compound. Perhaps the following phenomena play a part: Probably the molecules of the iodides form so to say islands in the selenium, by which the easy passage of current through the selenium is promoted, but without the compounds themselves need be conductive.

When starting with the separate constituents of the compound which are dissolved each individually in the selenium, this solution ensures an extremely fine division of the constituents and consequently also of the compound to be formed afterwards in the selenium. Probably it is just this extremely fine division by which the conductivity is greatly improved.

Materials which are each individually entirely or partly soluble in selenium and form a compound in the liquid selenium, owing to the high temperature used in the method of manufacture of the selenium electrode are, for instance, copper and iodine, mercury and iodine, bismuth and iodine.

The invention will be more clearly understood by reference to a few examples.

Amorphous selenium is melted and while keeping it at a temperature of about 300° C. about one part by weight of stannous-iodine per 100 parts by weight of the selenium is added while stirring. After the $SnI_2$ has been dispersed as homogeneously as possible in the selenium mass and about the whole quantity of $SnI_2$ has passed into the dissolved state the mass is cooled down. After that, the selenium is converted into the conductive crystalline modification by heating to about 200° C. for a sufficient time of say about 20 hours in the present case. In this manner a selenium mass is obtained whose specific resistance amounts to about 1100 ohms per cm.

When using stanni-iodide ($SnI_4$) instead of stannous-iodide the same specific resistance is achieved.

In a similar manner all of the iodides may be added and it will be set out in the following example how the iodide is formed in a very finely divided state in the selenium by means of a chemical reaction.

Amorphous selenium is melted in a container and 1.5 per cent by weight of bismuth is dissolved in the selenium. In a similar quantity of the same selenium melted in another container 3% iodine is dissolved. After that the contents of the two containers are brought together and mixed, whereupon the formation of the compound bismuth iodide (BiI₃) ensues in the selenium, said compound being available in an extremely finely divided state in the selenium mass.

The electrode material is painted and smoothed or rolled in the liquid state on a metal support such as a brass plate or on a carbon plate or a carbon coated metal plate down to a thinness of about 0.05 mm.

After that the body thus formed is heated in a furnace to a temperature of about 200° C. After a period of the order of magnitude of about 10 hours the amorphous selenium is converted into the conductive crystalline state, the specific resistance then being reduced to 600 ohms per cm. During this treatment the selenium evaporates at the surface of the electrode so that the bismuth iodide appears at the contact surface. Since bismuth iodide itself is an insulating material a limiting layer having a high resistance is thus formed on the selenium, on to which layer the insulating coating of polystyrene is applied by painting a solution thereof in benzene up to the desired thickness of 1 micron. The limiting layer having a high resistance offers the advantage that the emission of the semi-conductive selenium electrode, which increases owing to the increased conductivity, is counteracted, thus securing the advantage of a high conductivity of the selenium electrode (viz. a higher load per surface unit) but avoiding the objection of a large counter-current, i. e. a poor rectification ratio. The limiting layer has such a thinness that the resistance through the system does not appreciably increase.

Finally a good conductive second electrode constituted by a conductor such as Wood metal or so-called gold varnish or the like is applied to the insulating coating.

In this example the insulating material bismuth iodide is used as an addition to the selenium. As an alternative semi-conductive iodides such as cuprous iodide (CuI) may be added which contain a little more iodine than the quantity corresponding to the stoichiometrical quantity. Due to the thermal treatment of the selenium for converting it into the conductive crystalline modification, a layer of selenium evaporates at the surface, so that the good conductive additions stay at the limiting surface and owing to this good conductive contact surface a homogeneous conductivity to the insulating coating is assured.

In dissolving entirely or partly the various constituents forming iodide in selenium it should be considered that during this dissolving operation a compound is usually formed with the selenium, bismuth and selenium forming, for instance, bismuth selenide, and iodine and selenium forming selenium iodide. When bringing them together bismuth iodide is formed from these compounds, which remains dispersed or dissolved in a very finely divided state in the selenium.

The combination of selenium with iodine to form selenium iodide is also accompanied by an increased conductivity of the selenium, it being possible, for instance, by simply adding iodine, consequently by the formation of selenium iodide, to obtain a specific resistance of the order of magnitude of 1000 ohms per cm.

In order that the invention may be clearly understood the accompanying drawing is given by way of example.

The selenium 1 is supported by a metal plate 2 which may consist of iron. The insulating coating 3 consists of collodion on to which a second electrode 4 having a highly electron emissive capacity and constituted by a drop of gold varnish is applied, in which a connecting wire 5 is inserted. By drying the varnish the supply wire is consequently both electrically and mechanically secured to the electrode of gold varnish.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is:

1. An asymmetric electrode system including a metal base and a coating of selenium containing iodides for increasing its conductivity on said metal base, said inodides amounting to at least .05% of the amount of said selenium.

2. An asymmetric electrode system including a metal base and a coating of selenium containing about 1% of at least one of the compounds of iodine having an element of the analytic hydrogen sulphide group.

3. An asymmetric electrode system including a metal base and a coating of selenium containing between .05 and 1% bismuth iodide.

4. The method of increasing the conductivity of selenium which includes the steps of melting amorphous selenium and heating it at a temperature of about 300° centigrade, adding one part by weight of iodides to one part by weight of selenium and dispersing the iodides homogeneously throughout the selenium mass, cooling the mass and then converting the selenium to a conductive crystalline form by heating to about 200° centigrade for a predetermined period of time.

5. The method of increasing the conductivity of selenium which comprises melting a quantity of amorphous selenium and dissolving 1.5% by weight of bismuth in the melted selenium, melting a similar quantity of amorphous selenium and dissolving about 3% of iodine by weight in the last quantity of melted selenium, mixing the above elements together to form a compound of bismuth iodide in said selenium and cooling said mixture to convert said mixture to the solid state and heating the solidified material to a temperature of about 200° for a predetermined period of time to convert the amorphous selenium into a conductive crystalline state.

6. The method of increasing the conductivity of selenium which comprises dissolving a quantity of bismuth and a quantity of iodine in equal quantities of melted amorphous selenium, mixing the above elements together to form a compound of bismuth iodide, cooling the resulting mixture to the solid state and heating the solidified material to a temperature of about 200° for a predetermined period of time to convert the amorphous selenium into the conductive crystalline form.

7. The method of forming an unsymmetrical electrode system comprising mixing 1.5% by weight of bismuth and 3% by weight of iodine in equal quantities of melted amorphous selenium, mixing the elements to form a compound of bismuth iodide in the selenium, applying the mixture to a metal base as a coating, cooling the mixture to a solid state, heating the solidified material at a temperature of about 200° for a predetermined period of time to convert the amorphous selenium to the crystalline form.

8. The method of forming an unsymmetrical electrode system comprising mixing 1.5% by weight of bismuth and 3% by weight of iodine to equal quantities of melted amorphous selenium, mixing the elements and forming a compound of bismuth iodide in the selenium, applying the mixture to a metal base as a coating of about .05 mm. in thickness, cooling the mixture to a solid state, heating the solidified material at a temperature of about 200° for a predetermined period of time to convert the amorphous selenium to the crystalline form, and applying an insulating coating to the selenium coating and a conducting coating to said insulating coating.

9. An asymmetrical electrode system comprising a metal base coated with selenium containing about 1% of an iodide, an insulating coating on said selenium coating and a conducting coating on said insulating coating.

10. An asymmetrical electrode system comprising a metal base, a coating of carbon on said metal base, a coating of selenium containing about 1% of an iodide on said carbon and an insulating coating on said selenium coating, and a conducting coating on said insulating coating.

JAN HENDRIK DE BOER.
WILLEM CHRISTIAAN VAN GEEL.